United States Patent
Kolb

[11] 3,768,112
[45] Oct. 30, 1973

[54] WINDSHIELD WIPER DRIVE
[75] Inventor: Erich Kolb, Eisental, Germany
[73] Assignee: Robert Bosch GmbH, Stuttgart, Germany
[22] Filed: Nov. 1, 1971
[21] Appl. No.: 194,625

[30] Foreign Application Priority Data
Oct. 30, 1970 Germany.................. P 20 53 373.7

[52] U.S. Cl......... 15/250.21, 15/250.16, 15/250.24, 15/250.3
[51] Int. Cl............................ B60s 1/20, B60s 1/34
[58] Field of Search..................... 15/250.13, 250.14, 15/250.16, 250.17, 250.21, 250.24, 250.25, 250.26, 250.27, 250.3, 250.29

[56] References Cited
UNITED STATES PATENTS
1,661,388  3/1928  Sather............................. 15/250.21
2,984,855  5/1961  Murray............................ 15/250.29
3,644,956  2/1972  Parker............................ 15/250.29
3,686,706  8/1972  Finley............................. 15/250.24

Primary Examiner—Peter Feldman
Attorney—Michael S. Striker

[57] ABSTRACT

Windshield wipers are rigidly mounted on carriages guided along a guide track so that the wipers move in a translatory movement along the windshield when the carriages are on substantially straight track portions, but move angularly when the carriages are on curved track portions. Each carriage has three follower rollers for which two rollers, and one roller, respectively, engage opposite sides of the guide track so that the carriages with the wipers follow the curved track portion, without turning relative thereto and the wipers perform an angular movement to an end position.

17 Claims, 5 Drawing Figures

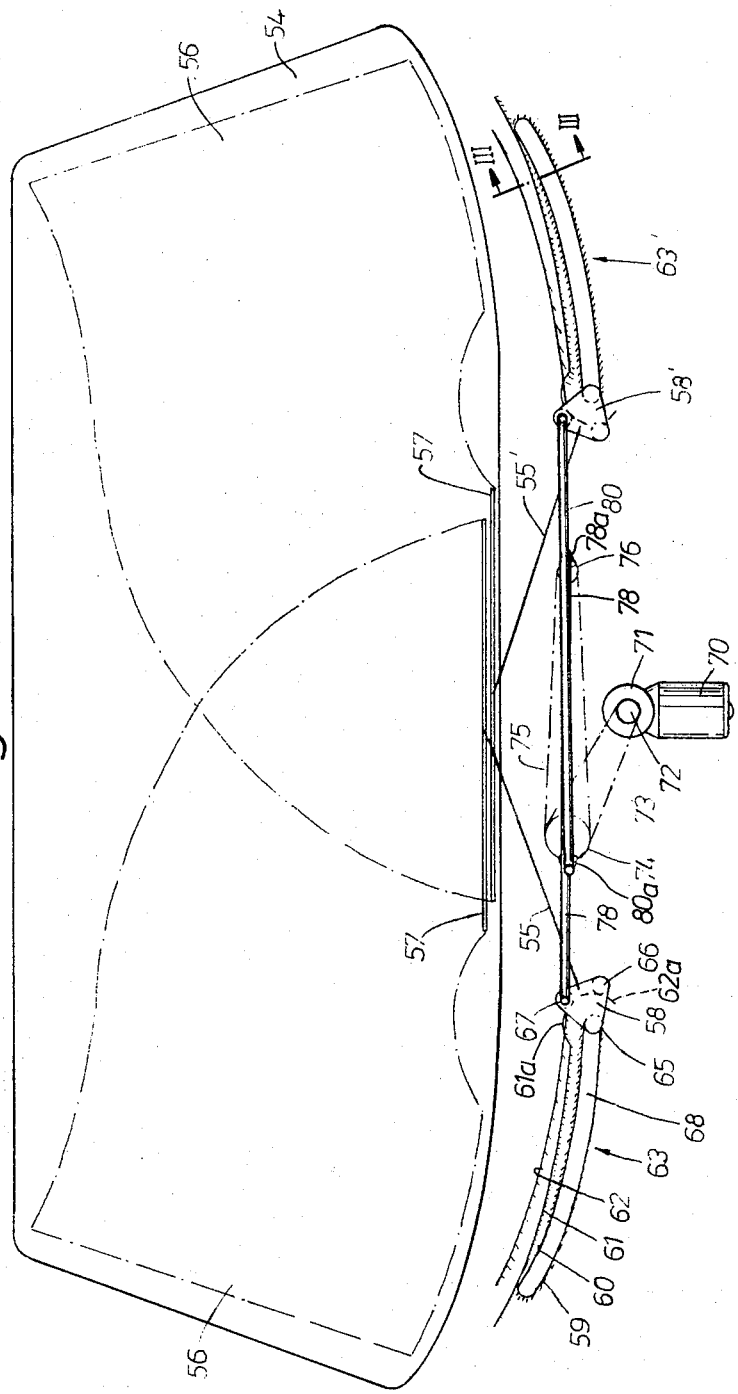
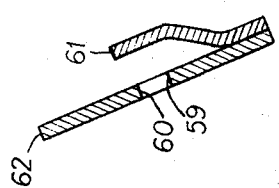

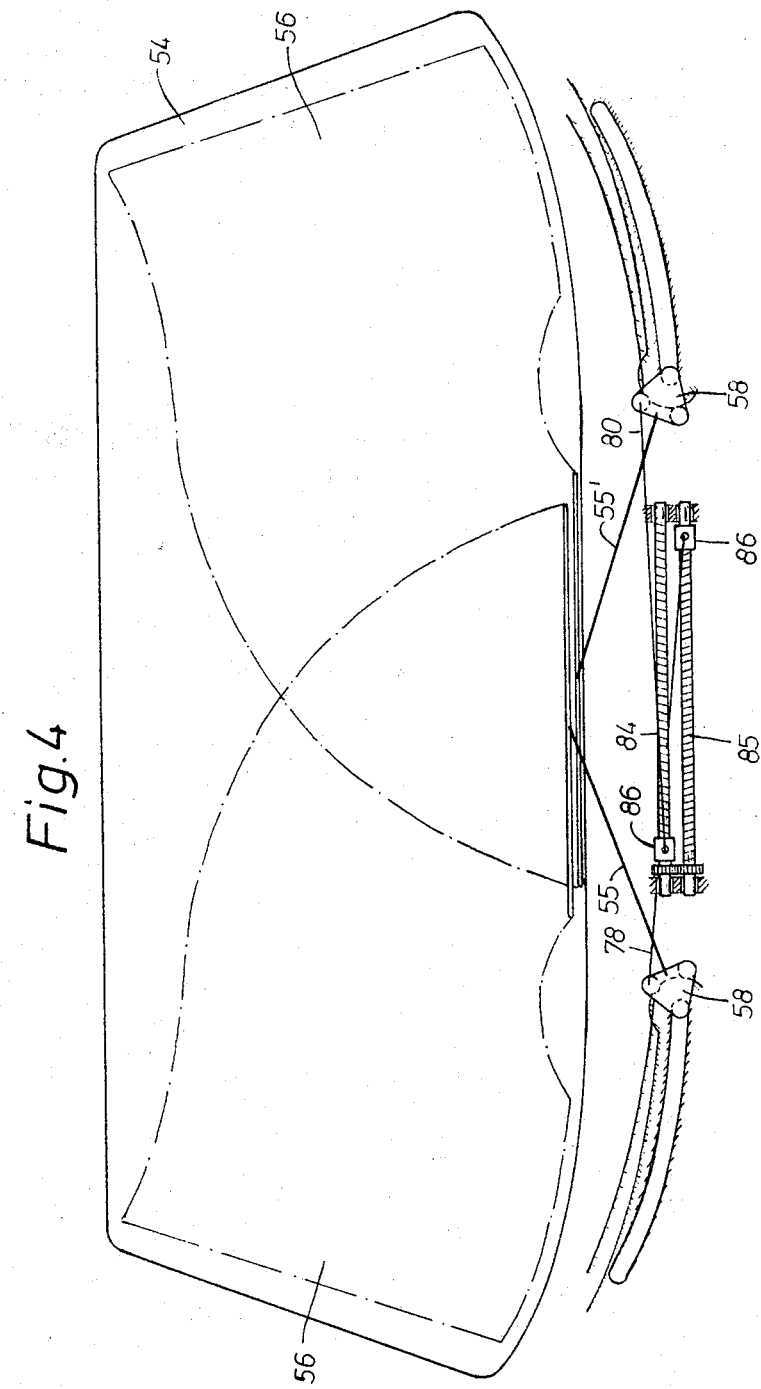

WINDSHIELD WIPER DRIVE

BACKGROUND OF THE INVENTION

The present invention relates to a drive for windshield wipers of vehicles, particularly automobiles. Windshield wipers are known which are partly moved in a translatory motion along the windshield, and partly turned about an axis perpendicular to the windshield, particularly when approaching end positions. Windshield wiper arrangements of this type are particularly suitable for cleaning windshields which have a high ratio between horizontal length and height.

In an apparatus according to the piror art, the wiper is pivotally mounted on a carriage which moves along a guide track adjacent the edge of the windshield. In order to obtain, in addition to a translatory movement, also an angular movement of the wiper, a second guide track is provided for moving the wiper in an angular movement relative to the carriage. Apparatus of this type is expensive, and has the disadvantage that jamming may occur, and detrimentally influence the function of the wiper.

SUMMARY OF THE INVENTION

It is one object of the invention to provide a windshield wiper drive of simple construction in which translatory and angular movement of a wiper is obtained by a single guide track.

Another object of the invention is to move the wiper in an angular movement by guiding a carriage rigidly supporting the wiper along a curved cam track portion.

Another object of the invention is to move a pair of wipers at different speeds to parallel end positions adjacent the bottom edge of the windshield.

With these objects in view, a carriage to which the wiper is fixedly secured is moved along a guide track means which has a guide portion deviating from a straight line so that the carriage with the wiper is turned about an axis perpendicular to the plane of the windshield, causing the wiper to move about a curved path on the windshield. A second guide means for angularly displacing the wiper relative to the carriage is not required so that the apparatus is substantially simplified and more reliable as compared with the prior art.

Generally speaking, the windshield wiper drive according to the invention comprises at least wiper adapted to slidingly engage a windshield; a carriage rigidly supporting one end of the wiper, and including follower means, preferably three rollers; guide means extending along the windshield and supporting the carriage for movement, and drive means for reciprocating the carriage along the guide means.

The guide means include guide track means having a first track portion engaged by the follower means for guiding the carriage and the wiper in a translatory movement along the windshield, and a second track portion engaged by the follower means and being curved for guiding the carriage and the wiper in an angular movement about an axis substantially perpendicular to the windshield, and located in the center of curvature of the second curved track portion.

The guide track means include two guide tracks on opposite sides of the guide means, and at least one of the two guide tracks includes the above mentioned first and second track portions. Each of the two guide tracks is engaged by at least one of the follower rollers so that the carriage, and thereby the wiper fixed thereon, move along a curved path defined by the curved second track portions.

When a pair of windshield wipers is provided whose paths overlap in the central region of the windshield, the guide track means are so arranged that the angular movement of the wipers takes place in the central region of the the windshield. When the position of rest of two wipers is vertical and parallel at the center of the windshield, the guide track means are suitably curved at the ends thereof to turn the wipers to a position parallel to the lateral edges of the windshield, to obtain complete cleaning.

It is advantageous to provide a single motor for a pair of cooperating wipers on the same windshield, the motor being connected with reciprocating means which are connected by articulated push rods with the carriages of the wipers. The reciprocating motion may be derived from one or two endless bands, or threaded spindle means may be driven by the motor for reciprocating nuts to which the push rods are articulated.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 3 is a fragmentary schematic front view illustrating another embodiment of the invention in which a pair of wipers has a position of rest located adjacent the bottom edge in the regions of the central portion of the windshield;

FIG. 3a is a sectional view on a reduced scale taken on line III—III in FIG. 3; and FIG. 4 is a fragmentary schematic view illustrating a modification of the embodiment of FIG. 3 in which the drive means include threaded spindles.

DESCRIPTION OF THE PREFERRED EMBODIMENTS

Figure 1:
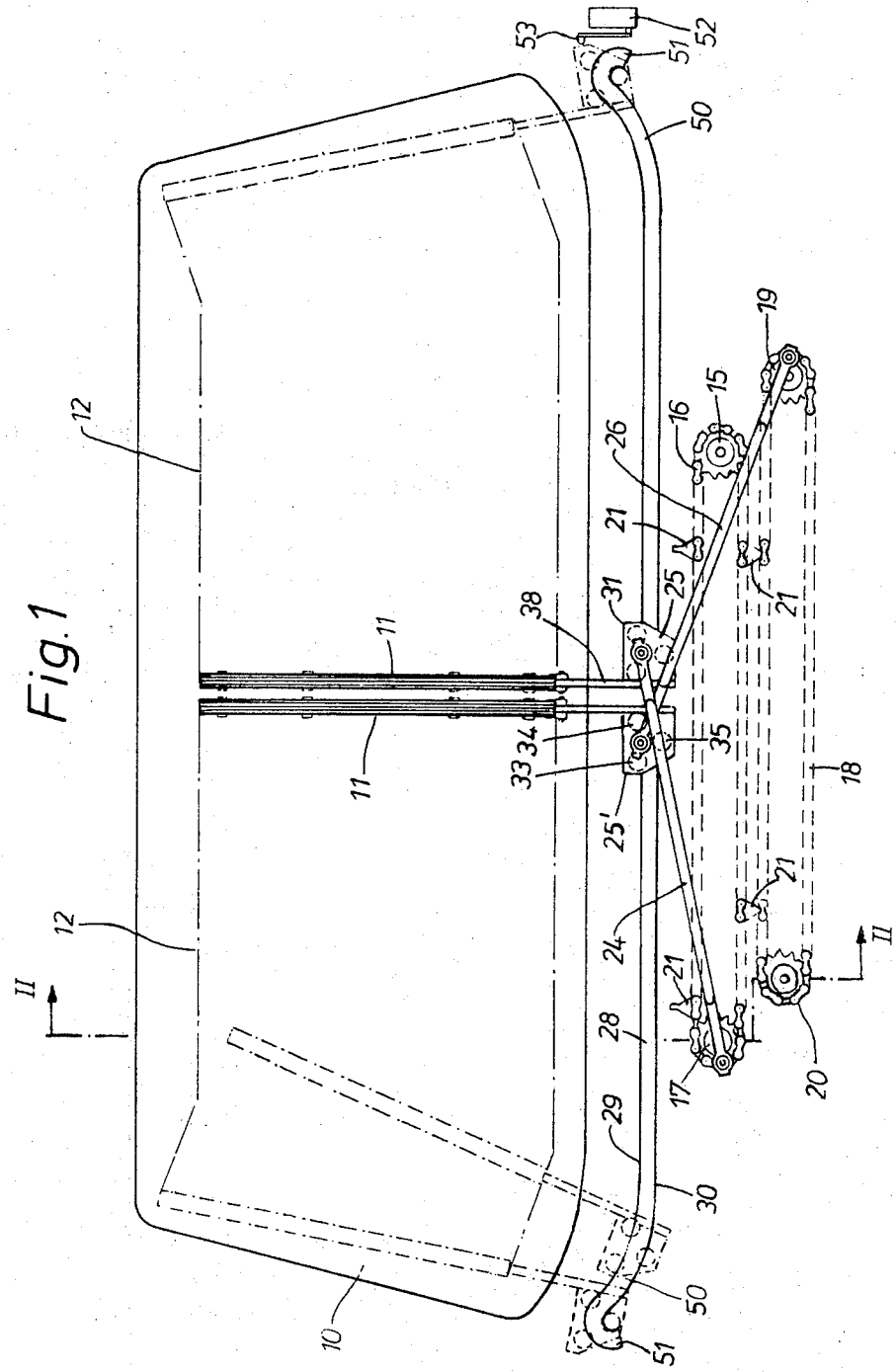
FIG. 1 is a fragmentary schematic front view of a first embodiment of the invention in which a pair of wipers has a central vertical position, and another condition in which each wiper in located at one lateral end of the windshield parallel to the lateral edge of the same.
Figure 2:
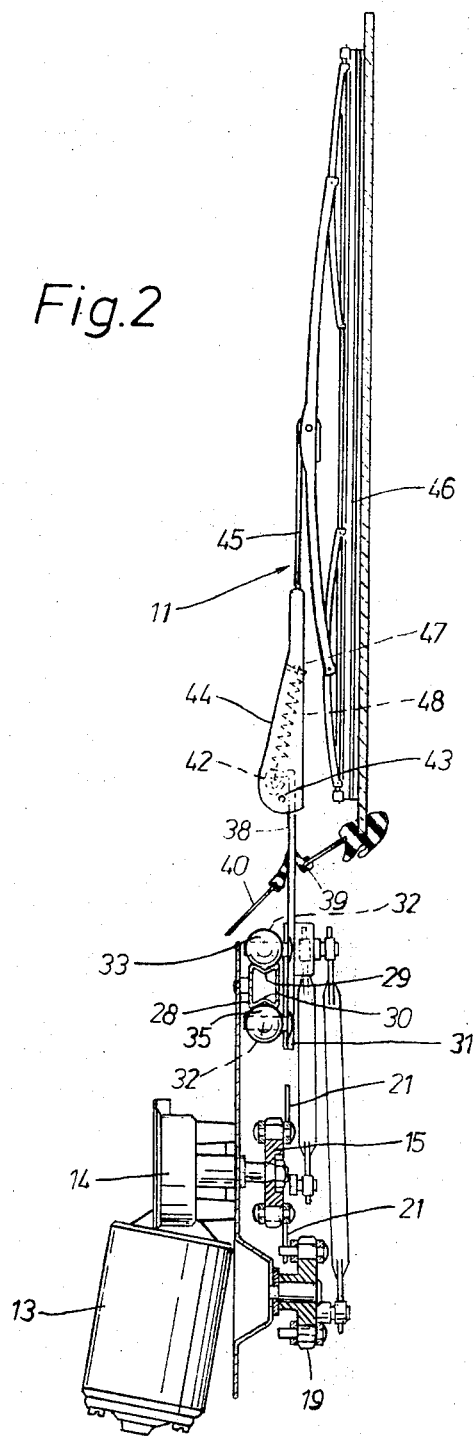
FIG. 2 is a fragmentary sectional view taken on line II—II in FIG. 1.

Referring first to FIGS. 1 and 2, the windshield 10 has a great horizontal width and a smaller vertical height. A pair of wipers 11 is to be operated between the position illustrated in solid lines in FIG. 1 and positions located at the lateral ends of windshield 10 by movement in opposite directions.

An electric motor 13, see FIG. 2, drives through a reducing worm gear transmission 14 a chain wheel or pulley 15 which is connected by an endless chain or band 16 with a second chain wheel or pulley 17. Below the chain drive 15, 16, 17, a second chain drive is disposed which includes an endless chain or band 18 and two chain wheels or pulleys 19, 20. Connector elements 21 are attached to chain 16 uniformly spaced from each other and engage chain 18 after moving about chain wheel 15 so that chain 18 is driven in a direction opposite to the direction of movement of chain 16.

A push rod 24 is articulated to chain 15 at one end, and has an other end articulated to a carriage 25 which is rigidly connected with one end portion 38 of one wiper 11. Correspondingly, the chain 18 is connected by an articulated push rod 26 with the carriage 25' of the other wiper 11. The pivotal connections between the push rods 24 and 26 with the chains 16 and 18, respectively, are spaced in the direction of movement of the chains about 180°, so that the two carriages 25 and 25' are driven in opposite directions. A common guide means 28 in the form of a hollow bar 28, see FIG. 2, support the carriages 25 and 25' with the respective wipers 11. As shown in FIG. 2, the top and bottom walls of the hollow bar 28 have longitudinal recesses 29, 30 of triangular cross section. Carriages 25, 25' are each provided with a supporting plate 31 carrying three journals 32 on which three follower rollers 33, 34, 35 with spherical surfaces are rotatably mounted. The arrangement is such that two follower rollers 33 and 34 engage the upper guide track 29, while the third follower roller 35 engages the lower guide track 30, guide tracks 29 and 30 being provided on opposite sides of guide means 28 to prevent relative displacement between the follower rollers 33, 34 and 35 and the guide track means 29, 30 of the guide means 28. Due to the recessed shape of the guide tracks 29 and 30, the supporting plate 31, to which the wiper arms 38 are secured, respectively, is reliably held and guided in the illustrated upright position.

The wiper arms 38 pass through a slot in the car body 40 covered by elastic lips 39. The upper end of each wiper arm 38 is bent to an eye 42, and also connected with a journal 43 on which a attaching member 44 for the wiper arm 45 is articulated. The cross section of member 44 is U-shaped. Wiper arm 45 carries a wiper blade 46 of conventional construction, and a spring 48 secured to eye 42 and to a projection 47 of member 44 biasses the wiper arm 45 and the wiper blade 46 toward the windshield 10.

As best seen in FIG. 1, the guide means 28 has a main portion extending along the front of the windshield 10 and being substantially straight and parallel to the windshield. Near the ends of guide means 28, slightly curved guide track portions 50 are provided, and at the extreme ends of guide track means 28, sharply curved guide track portions 51 are located, following the guide track portions 50. The inner diameter of the sharply curved guide track portions 51 is substantially equal to the diameter of the guide roller 35 of the three guide rollers 33, 34, 35 rotatably mounted on the carriages 25, 25'. Consequently, follower roller 35 can enter the respective space within guide portion 51, while the follower rollers 33, 34 move along the curved outer guide track of portion 51 in a turning movement about the axis of follower roller 35.

Adjacent the curved portion 51, a switch 52 is mounted whose actuator 53 projects into the path of the carriage 25.

When the two wipers 11 are not operated, they are in the positions of rest indicated in broken lines in which they are substantially parallel to the lateral edges at the ends of the windshield. Motor 13 is running, and drives through the worm gear 14 chain wheel 15 so that chain 16 moves and also drives chain 18 through connector member 21. The chains 16 and 18 reciprocate the push rods 24, 26 and the carriages 25, 25' with the wipers 11 in opposite direction so that the wiper blades 46 sweep the area 12 of windshield 10.

In the slightly curved guide portions 50 of guide means 28, carriages 25, 25' are guided along a curved path parallel to the lower edge of windshield 10 which is curved in this region. Wipers 11 are angularly displaced toward the center region of the windshield, as shown in broken lines for the left wiper in FIG. 1. The sharply curved guide tracks 51 compensate this undesired angular displacement of wipers 11. When the lower follower rollers 35 engage the inner curved guide track of portion 51, push rods 24 and 26 turn the carriages 25, 25' about the axes of the follower rollers 35 until the carriages 25, 25' assume the position shown for carriage 25' in chain lines on the left side of FIG. 1. The angular displacement of the carriages 25, 25' also turns the rigidly secured wipers 11 until the same are in end position extending parallel to the lateral edges of the windshield.

The switch of motor 13, and the switch 52 are connected in parallel so that when the motor is switched off, it is still connected to a voltage until the wipers 11 have reached the extreme lateral end positions, and the respective carriage 25 engages the actuator arm 53 of switch 52 and opens switch 52 to stop motor 13.

The embodiment of FIG. 3 is particularly suited for a very large panoramic windshield 54 of an automobile. Two wiper arms 55 and 55' carry wiper blades 57 and are fixedly secured to carriages 58 and 58', respectively. Wiper blades 57 are moved in opposite directions and respectively sweep areas 57 which overlap in the central region of the windshield 54. In the outer end positions, the wiper blades 57 are substantially parallel to the respective lateral edges of windshield 54, while the wiper blades 57 are substantially parallel and located at the lower edge of windshield 54 in the other wiper end position shown in FIG. 3. The illustrated position is the position of rest of the wipers, from which each wiper moves first in an angular movement and then in a translatory movement toward the lateral ends of the windshield 54.

The arm 55, 55' of each wiper is rigidly secured at one end to the carriages 58 and 58', respectively. Each carriage cooperates with the guide means 63 and 63', respectively, each guide means having guide track means 59, 60, 61 and 62. Each carriage 58, 58' includes a support rotatably supporting the follower roller 65, 66 and 67, the wiper arms 55 and 55' being respectively rigidly secured to the supports.

One follower roller 65 is located in a guideway 68 which is formed between two guide tracks 59 and 60. Follower roller 66 is guided along the guide track 62, while follower roller 67 is guided along the guide track 61 which is slanted to guide track 62 and guide track 60. All four guide tracks 59 to 62 follow substantially the upwardly curved contour of the lower edge of the windshield 54, but guide track 61 is less steep than the other guide tracks. At the inner ends of the guide means 63, 63' the respective guide tracks 61 and 62 have guide track portions 61a, 62a of circular shape whose centers are located in the axes of the respective follower roller 65, which is shown to be located at one end of the guideway 68.

A motor 70 is provided which drives through reducing transmission 71 a chain wheel 73 which is connected by endless chain 73 with another chain wheel 47. Axially spaced from chain 73, another endless chain 75 passes over chain wheel 74, and a second chain wheel 76 whose diameter is smaller than the diameter of chain wheel 74. A push rod 78 is articulated to chain 75 at the point 78a, and has an end connected with a journal of the follower roller 76 of carriage 78.

Axially behind the chain drive 74, 75, 76, a second chain drive, not visible in FIG. 3, is provided which has the same dimensions as the chain drive 74, 75, 76, and which is also driven from motor 70. This second chain drive is connected at 80a with a second push rod 80 whose other end is articulated to the carriage 58'. The arrangement is such that in the illustrated position of rest, the connecting point 78a of the push rod 79 connected with wiper 55 is located on chain 75 in the region of the small chain wheel 76, while the connecting point 80a of the other push rod 80 is located in the region of the large chain wheel which corresponds to chain wheel 74 and is located behind the same.

When the motor is started, the two chains 75 are driven in opposite directions. When the wipers 57 move out of the illustrated position of rest, the upper wiper 55, 57 is moved by push rod 78 at a higher speed than the lower wiper 55', 57 due to the smaller diameter of chain wheel 76, so that a collision between the wiper blades 57 in the commonly swept central portion of the windshield 54 is avoided. Pushrods 78 and 80 cause first an angular movement of the two wipers 55, 55', 57 during which the follower rollers 66 and 67 move over the circular guide track portions 61a and 62a. This angular movement is followed by a substantially translatory movement of the wipers toward the outer lateral end positions. During this movement, the third follower roller 65 moves along the guideway 68, while the other follower rollers 66 and 67 move along the slightly curved guide track portions 61 and 62. Due to the different gradient of the guide track portions 61 and 62, which are slanted to each other, the wiper blades 57 can be moved to end positions parallel to the lateral edges of the windshield. If guide track portions 61 and 62 were parallel, the wiper blades 57 would move along the curved end portions of the windshield in a somewhat slanted position, and would not be parallel to the lateral edges of the windshield in the end position.

During movement of the wipers toward the center portion of the windshield, the above-described operations take place in a reverse order. Due to the different diameters of chain wheels 74 and 76, the lower wiper 55', 57 moves faster than the upper wiper to prevent a collison, but then increases its speed so that both wiper blades 57 assume the illustrated end positions simultaneously.

The embodiment of FIG. 4 corresponds fully to the embodiment of FIG. 3 as far as the operation of the wipers is concerned. However, in the embodiment of FIG. 4 the motor 70, not shown in FIG. 4, drives two threaded spindles 84 and 85, each of which has a left-hand and a right-hand thread engaged by reciprocating nuts 86 to which the push rods 78 and 80 for the carriages 58 and 58' are respectively articulated. Due to the crossing of the left-hand and right-hand threads at the ends of the spindles 84 and 85, the nuts 86 are reciprocated so that the push rods 78 and 80 operate the carriages 58 to obtain angular and translatory movements of the wipers, as described with reference to FIG. 3.

Instead of threaded spindles, racks may be provided which are reciprocated by a pinion from the motor, and are connected with push rods in a suitable manner.

It will be understood that each of the elements described above, or two or more together, may also find a useful application in other types of windshield wiper drives differing from the types described above.

While the invention has been illustrated and described as embodied in a windshield wiper drive with a single guide track means for obtaining translatory and angular movements of wiper blades, it is not intended to be limited to the details shown, since various modifications and structural changes may be made without departing in any way from the spirit of the present invention.

Without further analysis the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. Windshield wiper drive including at least one wiper adapted to slidingly engage a windshield; a guide means having a first track portion extending along said windshield, and a second track portion curved about an axis of curvature substantially perpendicular to said windshield; a carriage means rigidly supporting said wiper including rigidly mounted follower means guided by said guide track and being non-turnable relative to said guide track; drive means for reciprocating said carriage means with said follower means and said wiper successively along said first and second track portions so that said wiper first moves in a translatory movement along said windshield while said follower means engages said first track portion, and then moves in an angular movement with said carriage means and follower means rigidly about said axis of curvature while said follower means is guided by said second track portion.

2. Wiper drive as claimed in claim 1 wherein each of said first and second track portions includes two opposite guide track surfaces; and wherein said follower means slidingly engages one of said guide track surfaces at least at one point, and the other one of said guide track surfaces at at least two points to prevent relative turning between said follower means and said first and second track portions.

3. Windshield wiper drive comprising at least one wiper adapted to slidingly engage a wind shield; a carriage means including a support rigidly supporting said wiper, and follower means including a plurality of follower elements; guide means extending along the windshield and supporting said carriage means for movement, said guide means including guide track means having a first track portion engaged by said follower means for guiding said carriage means and wiper in a translatory movement along said windshield, and at least one second track portion engaged by said follower means and being curved for guiding said carriage means and said wiper in an angular movement about an axis substantially perpendicular to the windshield and located in the center of curvature of said second curved track portion, said guide track means including at least two guide tracks on opposite sides of said guide means, at least one of said guide tracks including said first and second track portions; each of said two guide tracks being engaged by at least one of said follower elements.

4. Wiper drive as claimed in claim 3 wherein said plurality of follower elements includes three guide rollers; and wherein two of said guide rollers engage said one of said two guide tracks, and the third guide roller engages the other of said two gudie tracks.

5. Wiper drive as claimed in claim 4 wherein said other guide track is a recessed guide way in said guide means having a width corresponding to the diameter of said third guide roller; and wherein said third guide roller is mounted in said guide way for movement along the same.

6. Wiper drive as claimed in claim 5 wherein said guide means has one end located in the central region of the windshield, and the other end located at one lateral end of the windshield; wherein said second curved track portion of said one guide track is located at said one end of said guide means, and is part-circular with the center of curvature located in the axis of said third guide roller so that said wiper moves along a curved path in said central region of said windshield.

7. Wiper drive as claimed in claim 6 wherein said two guide tracks are slanted to each other toward said other end of said guide means so that said carriage means and wiper move in an angular movement while moving in a translatory movement so that said wiper is turned to be located along said lateral end of said windshield.

8. Wiper drive as claimed in claim 6 wherein said drive means include a reciprocating push rod, and pivot means connecting one end of said push rod with said carriage a a point spaced from the axis of said third guide roller.

9. Wiper drive as claimed in claim 8 wherein said pivot means also supports one of said two guide rollers for rolling along said one guide track.

10. Windshield wiper drive comprising two wipers adapted to slidingly engage a windshield, each wiper having one end position located in the center region of the windshield adjacent the lower edge of the windshield and another end position located at the lateral ends of the windshield; two carriage means rigidly supporting said wipers, respectively, and having follower means; two guide means supporting said two carriage means, respectively, each guide means including guide track means including a first track portion engaged by said follower means for guiding said wipers from said lateral ends toward said central region of said windshield in a translatory movement, and a second curved track portion for guiding said wipers in an angular movement in said central position of said windshield to said one end position in which said wipers are parallel to each other and to the lower edge of the windshield, said second curved track portions guiding said carriage means and said wiper in said angular movement about said axis substantially perpendicularly to the windshield, said axis being located at the center of curvature of said second curved track portion; and drive means for reciprocating said carriage means along said guide track means.

11. Wiper drive as claimed in claim 10 wherein said drive means are located between said two guide means, and include two reciprocating means reciprocating in opposite directions, and connected with said carriage means, respectively; and a motor for driving said reciprocating means.

12. Wiper drive as claimed in claim 10 wherein said drive means include endless band means driven by said motor; and wherein said reciprocating means include two rods articulated to said endless band means and connected with said carriage means, respectively.

13. Wiper drive as claimed in claim 12 wherein said endless band means include a pair of pulleys having different diameters so that said wipers move at different speeds in said central region of the windshield to and from said one end position.

14. Wiper drive as claimed in claim 12 wherein said endless band means include two endless bands; and wherein said two rods are articulated to said endless bands, respectively.

15. Wiper drive as claimed in claim 10 wherein said drive means include treaded spindle means driven by said motor; and wherein said reciprocating means include nut means mounted on said spindle means, and push rods having ends articulated to said nut means and to said carriage means.

16. Wiper drive as claimed in claim 10 wherein said drive means include rack means, push rods having ends articulated to said rack means and said carriage means, and a pinion meshing with said rack means and riven by said motor.

17. Windshield wiper drive comprising at least two wipers, each wiper having one end position located in the center region of the windshield parallel to the other wiper and transverse to the longitudinal direction of the windshield, and another end position located at the lateral ends of the windshield, respectively; two carriage means rigidly supporting said wipers, respectively, and having follower means; two guide means supporting said carriage means, respectively, each of said guide means including guide track means having a first track portion for guiding said wipers in said center region in a translatory movement in opposite directions out of said one end position, and a second curved track portion being curved for guiding said carriage means and said wiper in an angular movement about an axis substantially perpendicularly to the windshield and located in the center of curvature of said second curved track portion, respectively, said second curved track portion guiding said wipers, respectively in angular movements to the other end positions located parallel to the lateral ends of said windshield; and drive means for reciprocating said carriage means along said guide track means.

* * * * *